United States Patent [19]
Pommerening et al.

[11] 3,999,018
[45] Dec. 21, 1976

[54] TIMER ASSOCIATED WITH CB RELAY
[75] Inventors: Uwe A. Pommerening, Webster; Glenn L. Richards, Caledonia, both of N.Y.
[73] Assignee: Stromberg-Carlson Corporation, Rochester, N.Y.
[22] Filed: Mar. 5, 1975
[21] Appl. No.: 555,591
[52] U.S. Cl. .......................................... 179/18 FA
[51] Int. Cl.² ......................................... H04Q 3/20
[58] Field of Search ...................... 179/18 F, 18 FA
[56] References Cited
UNITED STATES PATENTS

| | | | |
|---|---|---|---|
| 3,622,709 | 11/1971 | Tjaden | 179/18 FA |
| 3,716,674 | 2/1973 | Manos | 179/18 FA |
| 3,781,483 | 12/1973 | Deisch | 179/18 F |

Primary Examiner—William C. Cooper
Attorney, Agent, or Firm—Donald R. Antonelli; William F. Porter, Jr.

[57] ABSTRACT

A circuit for detecting a true seizure condition of a trunk calling bridge relay employs a timer which is incremented every 40 milliseconds as long as a continuous trunk off-hook representative signal is supplied thereto for approximately 300 milliseconds. For momentary changes in the condition of the trunk CB relay the timer will be incremented and decremented so as to effectively filter out momentary trunk calling bridge seizure changes.

10 Claims, 2 Drawing Figures

TIMER ASSOCIATED WITH CB RELAY

FIELD OF THE INVENTION

The present invention relates to a timer, particularly one adapted for use for timing the seizure condition of a truck calling bridge relay, hereinafter referred to simply as on-hook or off-hook, respectively. The timing apparatus of the present invention is especially adapted for use with the timer apparatus described in our co-pending application Ser. No. 542,947 entitled "TIMER APPARATUS", filed Jan. 22, 1975, and assigned to the assignee of the present application. The timing apparatus described in the present application and in the above copending application are especially useful in the timer portion of the common control employed in the electronic private automatic branch exchange telephone system described in our copending application Ser. No. 431,928 entitled "Matrix-PBX" filed Jan. 9, 1974, also assigned to the assignee of the present application.

As was mentioned above, the present invention operates as a timer for a trunk on-hook or off-hook condition. In monitoring the on-hook and off-hook condition of the trunk, the system observes the condition of the calling bridge relay associated with the trunk. During the establishment of a call, the condition may arise wherein the calling bridge relay of the trunk is momentarily seized, yet, in reality, the true on-hook or off-hook condition of the trunk has not changed.

In accordance with the present invention, a timer apparatus is provided wherein momentary changes in the seizure condition of the trunk calling bridge relay are filtered out through a counting process which introduces an approximately 300 millisecond delay between the change of state of the original controlling function of the relay and the output of the circuit. Momentary changes in the state of the trunk CB junction will be filtered out by this counting process.

BRIEF DESCRIPTION OF THE INVENTION

In accordance with the present invention, for a true on-hook or off-hook condition of the CB relay, there will be stored in a memory a prescribed count value which indicates the on-hook or off-hook condition of the relay. In response to any change in state of the trunk CB junction, an up/down counter will be triggered to begin changing the value of the indication stored in memory. The count takes place at prescribed intervals and it is not until and unless the count stored in memory has been increased or decreased by a prescribed number that the system will provide an indication of a true change in state of the trunk CB junction. For a true on-hook condition of the trunk CB relay, a binary count 000 will be stored in memory. In response to an apparent off-hook trunk signal, the up/down counter will increment the digital quantity stored in memory one bit every 40 milliseconds until a prescribed count (111 corresponding to approximately 300 milliseconds) has been reached. Logic circuitry employed in the system recognizes that the quantity stored in memory has reached the value 111, prevents the counter from further advancing, and provides an output signal indicating of a true trunk off-hook condition.

If, during the incremental advance by the up/down counter, the trunk goes back on-hook, logic circuitry within the system causes the counter to begin counting back down towards its original value of 000. Upon reaching the quantity 000, the counter then ceases to decrement the quantity stored in memory and the system continues to provide a true on-hook condition.

Conversely, for a true off-hook condition of the CB junction, if the trunk momentarily goes back on-hook, the system causes the counter to begin counting down from the value 111 towards 000 at the same 40 millisecond stepped rate. Until and unless the counter fully advances the quantity stored in memory from the value 111 to the value 000, the system does not provide an indication that the trunk has gone back on-hook.

As a result, both momentary on-hook conditions and momentary off-hook conditions of the trunk CB relay can be filtered out, so that an erroneous indication to the remainder of the telephone system is not provided.

As an additional feature of the present invention, under certain conditions, the counter is caused to count at a rate slower than that for the normal incrementing in determining on-hook conditions, so that for an apparent failure indication through a ringing process of one second on and seven seconds off, the up/down counter will count down so slowly that it will bridge the period of silence for the particular trunk circuit, so that an off-hook indication from one ringing cycle to the next will be maintained.

DETAILED DESCRIPTION

Figure 1:
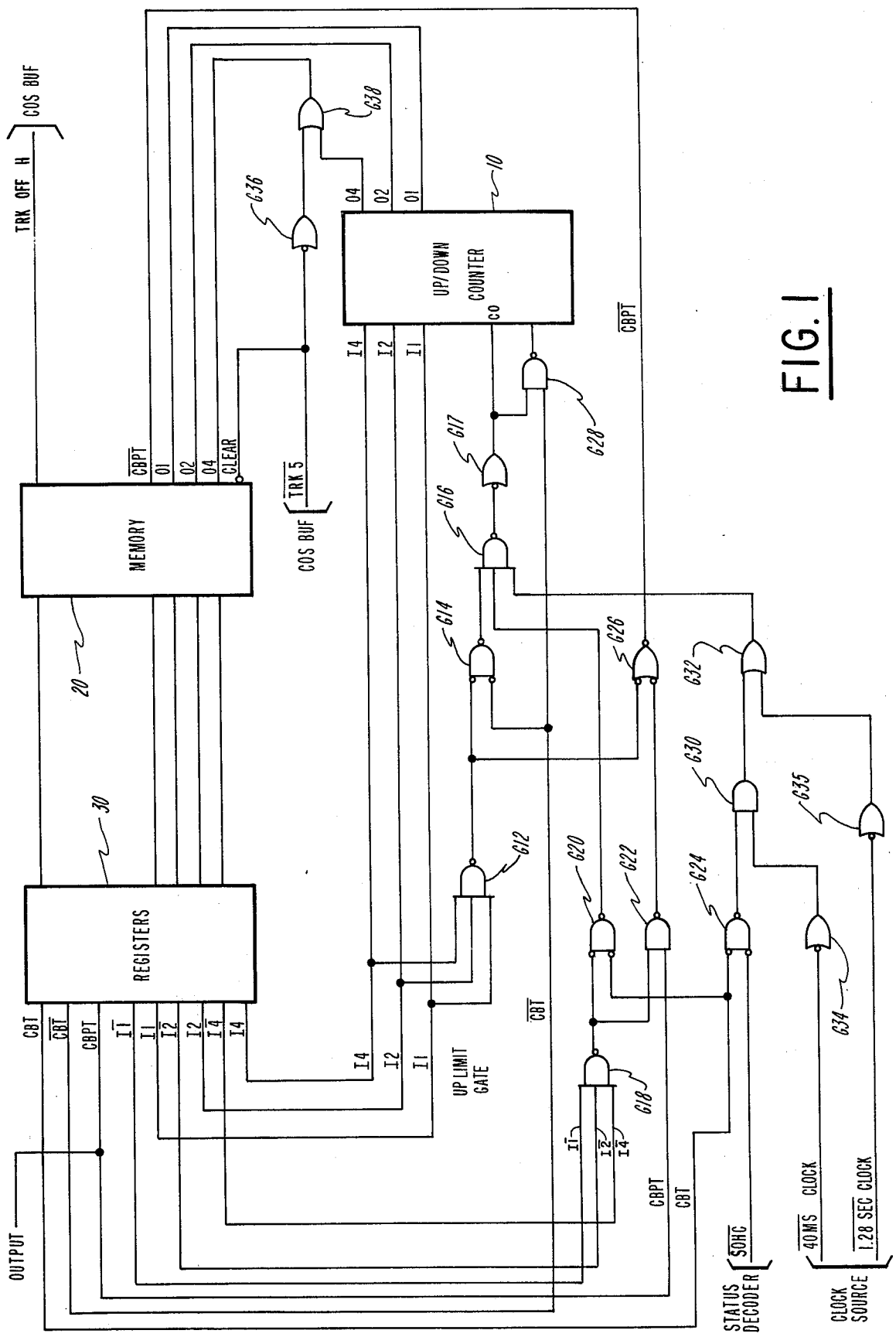
FIG. 1 is a logic circuit diagram of the timing apparatus in accordance with an embodiment of the present invention.

FIG. 1 depicts a circuit diagram of the trunk CB filter timing apparatus in accordance with the present invention. The system includes a memory 20 and associated registers 30 in which information bits corresponding to the state of the trunk CB relay are stored. The memory 20 also receives, over line TRK OFF H, a signal indicating the state of the trunk CB junction. In the above referred to electronic private branch exchange telephone system, this signal is supplied by the class of service buffer.

Lines O1, O2 and O4 correspond to the three binary bits employed to provide a maximum time delay of approximately 300 milliseconds (7 × 40 = 280 ≅ 300 milliseconds).

At the output of the registers 30, respective lines I1, I2, and I4, provide indications of the bits stored in memory, while lines $\overline{I1}$, $\overline{I2}$ and $\overline{I4}$ provide signals indicating the inverse of the contents of the memory. For example, for a true on-hook condition of the trunk CB relay, the three memory bits will be 000, so that the outputs on lines I1, I2 and I4 will each be "0", while lines $\overline{I1}$, $\overline{I2}$ and $\overline{I4}$ will all be "1"s. Lines CBT and $\overline{CBT}$ will either be conversely high or low corresponding to the signal level applied over line TRK OFF H, indicating the condition of the trunk CB junction.

The outputs from the registers 30 are connected to respective gates G12-G32, and to the input lines I1-I4 of the up/down counter 10. These gates provide the appropriate logic control functions for advancing and decrementing the counter 10 depending upon the contents of memory and whether or not an on-hook or off-hook trunk signal has been received. Clock signals are supplied to the inputs of gates G34 and G35 representative of the 40 millisecond and 1.28 second timing pulses employed in the system. A slow on-hook count signal is supplied to gate G24 for prescribed conditions to be discussed hereinbelow.

The up/down counter is incremented or decremented in response to the application of an input from gate G17 to terminal CO. Gate G28 causes the counter to count up or down depending upon whether the output of the gate "0" or a "1", respectively. The binary code, which has been supplied over lines I1 - I4 from the registers 30, is increased or decreased in accordance with the action of the up/down counter 10 and the new code is supplied over lines O1-O4 to the memory 20. The most significant bit of the three binary bits, the O4 bit, is coupled through OR gate G38, which also receives the output of a gate G36, the function of which will be discussed hereinafter.

OPERATION

Figure 2:
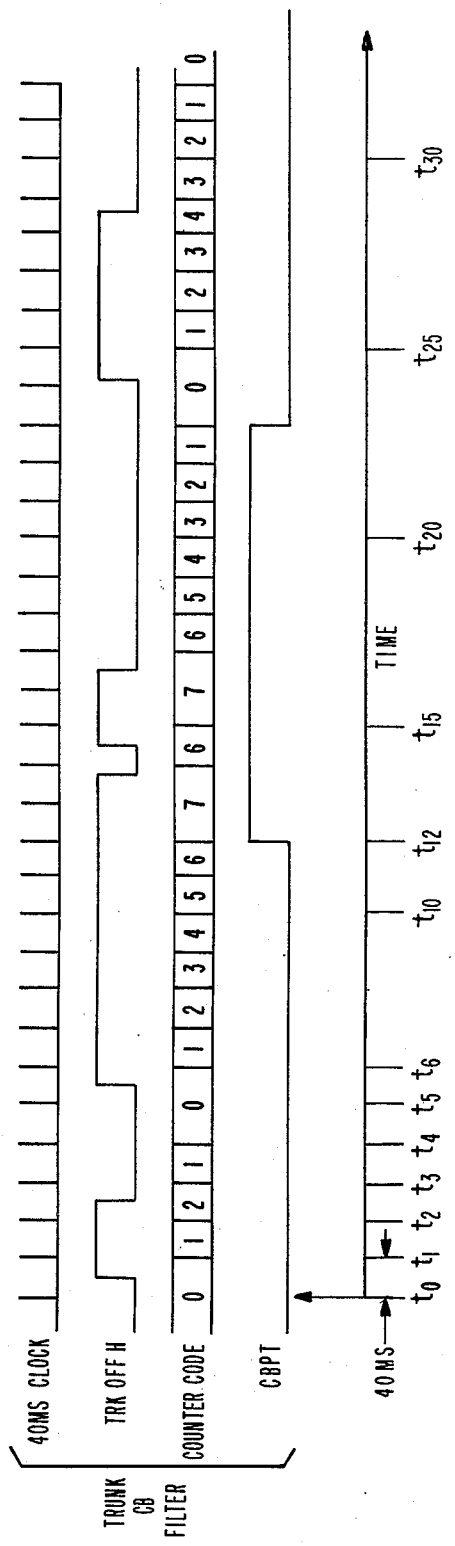
FIG. 2 is a timing diagram for illustrating the operation of the timing apparatus shown in FIG. 1.

For purposes of explaining the operation of the circuit shown in FIG. 1, attention is directed to FIG. 2, which illustrates both momentary changes in the state of the trunk CB junction and changes of a sufficient length of time to indicate true on-hook and off-hook conditions of the trunk. As shown at time in FIG. 2, the condition on line TRK OFF H applied to memory 20 is low, corresponding to a "0" or an on-hook condition of the trunk. At that time, the contents of memory 20 are assumed to be 000 and the up/down counter is not receiving an increment or decrement signal.

Now, between time t0 and the next 40 millisecond clock pulse which is supplied to gate G34, the condition on line TRK OFF H goes high, so as to supply a high level over line CBT to one of the inputs of gate G24, and a low level over line $\overline{CBT}$ is supplied to inputs of gates G14 and G28. Hereinafter, a high level will correspond to a "1", while a low level corresponds to a "0".

With the contents of memory 20 being 000, lines I1, I2 and I4 will supply "0"s to each input of the NAND gate G12. As a result, the output of NAND gate G12 will be a "1", which will be coupled through OR gate G14 to one of the inputs of NAND gate G16. Conversely, NAND gate G18 will supply a "0" at its output since the level of each of the inverse lines $\overline{I1}, \overline{I2}$ and $\overline{I4}$ corresponds to a "1". However, the off-hook condition on line CBT will be coupled through OR gate G20 to the second input of gate G16. Gate G16 also receives the 40 millisecond clock pulse signal through gate G34 and gate G30 and OR gate G32, so that by way of inverter gate G17, a "1" is supplied to the input of CO the up/down counter 10, so that the up/down counter 10 will change the contents of the code bits on lines I1-I4. Since, as was indicated above, the output of gate G28 is a "0" (line $\overline{CBT}$ is a "0") the up/down counter 10 will advance the contents on lines I1, I2 and I4 by a "1", so that the level on output line O1, now becomes a "1", while the levels of lines O2 and O4 remain at "0" and the number 001 is supplied to memory 20. This condition is shown in FIG. 2 wherein the counter code, corresponding to the count of the code over lines O1-O4 supplied to memory 20, has changed from "0" to a "1" at time t1.

Subsequently, upon receipt of the next 40 millisecond clock pulse at time t2, the same operation discussed above takes place, wherein the outputs on lines I1-I4 are increased from 001 to 010, as up/down counter 10 again advances the code and supplies it to memory 20. During this time, the output on line CBPT, which is the output representing the true on-hook or off-hook condition, remains low, since the full count of seven corresponding to a bit count 111 has not been reached. This condition is also shown in FIG. 2. Between the third 40 millisecond clock pulse at time t2 and the fourth 40 millisecond clock pulse at time t3, the level on line TRK OFF H drops back to "0", indicating that the off-hook condition of the trunk CB relay has been only momentary. At this time, the levels of lines CBT and $\overline{CBT}$ are reversed, so that the output of gate G28 now becomes a "1" and the up/down counter 10 decreases the code supplied over lines I1-I4 by "1" for each subsequent 40 millisecond clock pulse until a count of "0" is reached, as shown at time t5. At this time, each of the inputs to down-limit gate G18 becomes a "1", so that the output thereof is a "0". Since the level of line CBT is also a "0", the second input of gate G16 becomes a "0", so that its output becomes a "1", which, by way of inverting gate G17, supplies a "0" to the input CO of the up/down counter, thereby disabling the counter.

Subsequently, between the 40 millisecond clock pulses at times t5 and t6, an apparent off-hook condition is again supplied over line TRK OFF H, thereby again reversing the levels on lines CBT and $\overline{CBT}$. As a result, upon receipt of the 40 millisecond clock pulse at time t6, the operation referred to initially takes place, whereby the up/down counter 10 updates the contents of memory 20 by "1", from 000 to 001. As is shown in FIG. 2, the level on line TRK OFF H now remains high for a period of time long enough to permit the counter 10 to advance the code over lines I1 - I4 to a code of 111. When the code is advanced to a count of 7 (111) the output of the up-limit gate G12 changes from a "1" to a "0", so that the output of AND gate G26 changes to a "0". Thus, line $\overline{CBPT}$ changes to a "0", so that the CBPT output bit will change from a "0" to a "1" representing a true off-hook condition of the trunk CB relay.

Between time t13 and time t14, as shown in FIG. 2, there is a momentary on-hook indication; yet, this condition disappears between time t14 and time t15, so that the up/down counter 10 decrements only to a count of 6 (110) and then increases the count again to a count of 7 (111). Subsequently, between time t16 and t17, the level on line TRK OFF H changes from a "1" to a "0" and remains low for a time sufficient to permit the up/down counter 10 to decrement the code from a count of 111 to a count of 000. As a result at time t23, each of the inputs to down limit gate G18 becomes a "1" so that the output of gate G18 becomes a "0", to change the output of NAND gate G22 to a "1". Since AND gate G26 now has a "1" at each of its inputs, its output will be a "1", changing the level on line $\overline{CBPT}$ to a "1" and, conversely, changing the output on line CBPT to a "0", as shown in FIG. 2.

Thus, as will be appreciated from the foregoing description of the circuit shown in FIG. 1, the timing apparatus of the present invention effectively filters out momentary changes in state of the trunk CB relay and only permits a change in state which lasts continuously for a period of approximately 300 milliseconds to cause an output in the change of the indication of the status of the CB relay.

As a further feature of the present invention, gates G36 and G38 are provided for a particular type of trunk which requires that the system respond immediately to an off-hook indication rather than impose a 300 millisecond delay. By way of signal on line $\overline{TRK\ 5}$, the most significant bit over output line O4 is forced to be a "1" immediately, so that if the trunk seizure indication should change to an on-hook indication, and momentarily the counter must count down through the normal downcount process, the momentary on-hook indication will be bridged, but the incoming seizure will be permitted to be recognized immediately to allow direct inward dialing to proceed without delay.

In addition, under certain conditions, a slower counting rate is employed. A 1.28 second clock signal is supplied to gate G35 which is coupled through OR gate G32 to NAND gate G16. The use of this slower clocking rate is controlled by a slow on-hook count signal over line $\overline{SOHC}$ which is coupled through OR gate G24 to AND gate G30. This slow on-hook count is employed when the down count is to be extended from the normal 40 millisecond counting rate to a count of over a second per count, so that in response to an apparent failure indication through a ringing process of 1 second on — 7 seconds off, the down count of the counter 10 will be so slow that it will bridge the period of silence for the particular trunk circuit, in order to maintain an off-hook indication from one ringing cycle to the next. This prevents interference with the operation of the timing apparatus during a ringing condition which, while providing on-hook and off-hook signals, is not of the true type of on-hook or off-hook indication to which the present invention is directed.

While we have shown and described an embodiment in accordance with the present invention, it is understood that the same is not limited thereto but is susceptible of numerous changes and modifications as known to a person skilled in the art, and We therefore do not wish to be limited to the details shown and described herein but intend to cover all such changes and modifications as are obvious to one of ordinary skill in the art.

We claim:

1. In a telephone apparatus wherein a trunk circuit condition is monitored and signals corresponding to the seizure and non-seizure of said trunk circuit, respectively, are generated, the improvement comprising:
   timing means, responsive to a change in the condition of said trunk circuit, for timing the duration of one of said signals and generating an output signal indicative of a change in the condition of said trunk circuit, only upon the duration of one said signal exceeding a prescribed period of time, so that momentary changes in the condition of said trunk circuit will be effectively filtered.

2. The improvement according to claim 1, wherein said timing means includes
   a memory for storing signals representative of a digital code;
   a counter, coupled to said memory, for controllably changing the value of said digital code represented by the signals stored by said memory; and
   a logic control circuit, responsive to a signal representative of a change in the seizure condition of the trunk circuit, for causing said counter to change the value of said digital code at a prescribed periodic rate.

3. The improvement according to claim 2, wherein said logic control circuit includes means, responsive to a signal corresponding to a seizure condition of the calling bridge relay of said trunk circuit, for causing said counter to increase the value of said digital code by a prescribed bit count at said prescribed periodic rate, as long as said calling bridge relay remains continuously in said seizure condition, until said digital code is increased to a first predetermined number.

4. The improvement according to claim 3, wherein said logic control circuit further includes means, responsive to a signal corresponding to a non-seizure condition of the calling bridge relay of said trunk circuit, for causing said counter to decrease the value of said digital code by said prescribed bit count at said prescribed periodic rate, as long as said calling bridge relay remains continuously in said non-seizure condition, until said digital code is decreased to a second predetermined number.

5. The improvement according to claim 3, wherein said logic control circuit further includes means for generating an output signal corresponding to a seizure condition upon said digital code reaching said first predetermined number.

6. The improvement according to claim 4, wherein said logic control circuit further includes means for generating an output signal corresponding to a non-seizure condition upon said digital code reaching said second predetermined number.

7. The improvement according to claim 6, wherein said non-seizure condition output signal generating means includes means for continuously generating said output signal corresponding to a non-seizure condition until said digital code is increased from said second predetermined number to reach said first predetermined number.

8. The improvement according to claim 7, wherein said seizure condition output signal generating means includes means for continuously generating said output signal corresponding to a seizure condition until said digital code is decreased from said first predetermined number to reach said second predetermined number.

9. The improvement according to claim 4, wherein said logic control circuit further includes means, responsive to a ringing signal applied to said trunk circuit, during the non-seizure condition thereof for causing said counter to change the value of said digital code at selected periodic rate slower than said prescribed periodic rate.

10. The improvement according to claim 2, further including means, coupled to said memory, for presetting the code in said memory to a selected number independent of the operation of said counter.

* * * * *